United States Patent [19]

Pasternack et al.

[11] 3,952,160

[45] Apr. 20, 1976

[54] COIN TELEPHONE ARRANGEMENT TO OBVIATE ACOUSTICALLY COUPLED FRAUD

[75] Inventors: Gerald Philip Pasternack, Colts Neck; Lawrence Oliver Stevenson, Howell, both of N.J.; Gary Wayne Strong, Ann Arbor, Mich.

[73] Assignee: Bell Telephone Laboratories, Incorporated, Murray Hill, N.J.

[22] Filed: Nov. 14, 1974

[21] Appl. No.: 523,661

[52] U.S. Cl. .............................. 179/7.1 R; 179/6.31
[51] Int. Cl.² ........................................ H04M 15/18
[58] Field of Search ............ 179/7.1 R, 7.1 TP, 6.31

[56] References Cited
UNITED STATES PATENTS

| | | | |
|---|---|---|---|
| 3,453,389 | 7/1969 | Shaer | 179/7.1 R |
| 3,466,601 | 9/1969 | Tong | 340/146.1 |
| 3,546,395 | 12/1970 | Schuh | 179/81 |
| 3,814,907 | 6/1974 | Edington et al. | 235/92 |

OTHER PUBLICATIONS

"Is Automatic Long Distance . . . ", *Telephony* by Amin Zaky, Jan. 21, 1974, pp. 75–80.

"Automatization of Coin Toll Calls . . . ", *National Telecommunications Conf.*, Nov. 26–28, 1973, pp. 10D-1 to 10D-4.

W. W. Peterson et al., *Error–Correcting Codes*, 2nd Ed., Mit Press, Chap. 8, pp. 206–268, 1972.

*Primary Examiner*—Douglas W. Olms
*Attorney, Agent, or Firm*—Richard J. Roddy

[57] ABSTRACT

Apparatus for transferring coin deposit information from a coin telephone station to a telephone office, for example, a TSPS, is highly susceptible to acoustically coupled fraud. Acoustically coupled fraud is substantially obviated by an arrangement which intentionally interrupts the transmission facility periodically, thereby forcing errors in any acoustically coupled signals and causing their rejection at the telephone office. In addition, acoustically coupled fraud is obviated during transmission of coin deposit data to the office by disconnecting the coin station speech network from the transmission line during this time.

11 Claims, 7 Drawing Figures

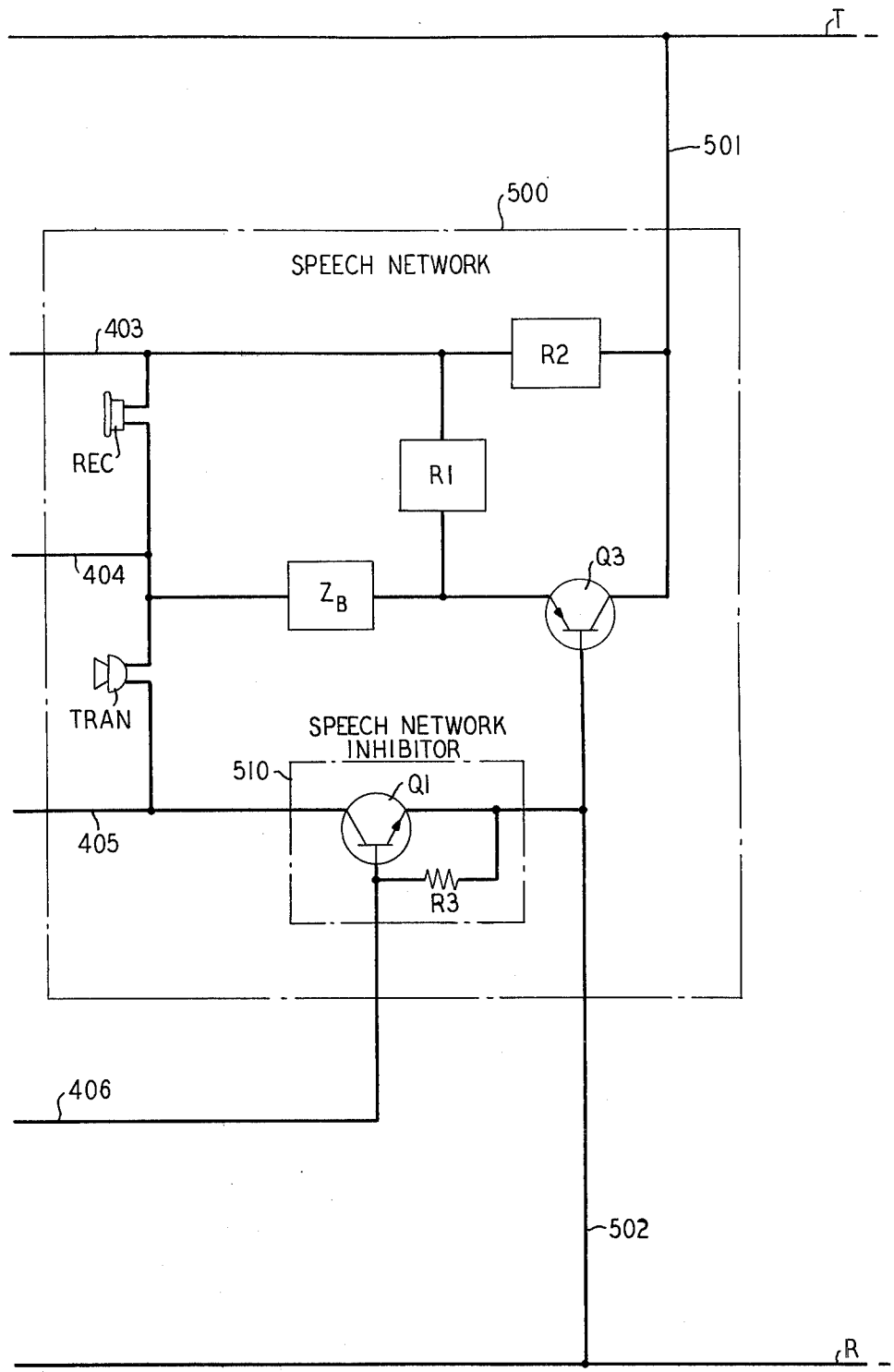
FIG. 3D
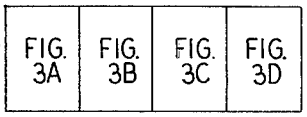

COIN TELEPHONE ARRANGEMENT TO OBVIATE ACOUSTICALLY COUPLED FRAUD

FIELD OF THE INVENTION

This invention relates to a coin telephone station and, more particularly, to a coin telephone station 3A improved facilities for obviating an acoustically coupled, fraudulently inserted coin deposit signal.

BACKGROUND OF THE INVENTION

U. S. Pat. No. 3,453,389 issued to N. R. Shaer on July 1, 1969 discloses an improved telephone switching system having facilities for serving customer-dialed, station paid calls originating at a coin telephone station. In particular, Shaer discloses equipment at a traffic service position system (TSPS) telephone office comprising: (1) recording announcement apparatus, which automatically transmits time and charge information to a calling coin station, and (2) a coin deposit monitor, which detects and utilizes tones generated at the calling station, in response to each coin deposit, to determine whether the amount deposited matches the amount requested. The announcement apparatus and the coin deposit monitor are utilized during various coin collection intervals, including the beginning of a call for the collection of an initial time duration deposit, the beginning of each overtime duration for the collection of interim overtime charges, and the termination of a call for the collection of postpay overtime charges.

Typically, the speech network in a coin telephone station remains connected to the telephone office during the coin collection intervals. Accordingly, a fraudulent coin deposit signal, acoustically coupled through the speech network at the coin telephone station, may compromise the collection process by falsely indicating the coin deposit amount. To help overcome such acoustically coupled signals, the speech network transmitter can be isolated from the telephone line during the duration of the coin collection interval in which stored coin deposit information is outpulsed to the telephone office. The isolation is accomplished in known arrangements by inhibiting the speech network transmitter, for example, by disconnecting the transmitter from the line, or by attenuating any acoustically coupled signals via a high impedance in the speech network transmitter. The out-pulsing, typically either multifrequency or dial pulse, is delayed until a special interrogation signal, received from the telephone office, is detected by an interrogation signal detector at the coin station.

An inherent problem with such known arrangements is that the signal detector must be capable of detecting an interrogation signal substantially below a local average signal power level. Further, the signal detector typically requires circuitry having high selectivity and high stability. Consequently, known arrangements using interrogation signal detectors are usually prohibitively expensive for use in the coin telephones of a large telephone system.

It is therefore a general object of the invention to provide an improved coin telephone station for serving coin calls.

It is a more specific object of the invention to obviate an acoustically coupled coin deposit signal, fraudulently inserted at a coin telephone station.

A further object of the invention is to obviate acoustically coupled coin deposit signals without using an interrogation signal and detector arrangement.

SUMMARY OF THE INVENTION

These and additional objects are achieved in accordance with the principles of our invention by an improved coin telephone station for automatically introducing an error in any acoustically coupled coin deposit signal which may be fraudulently inserted at the station. An error is introduced in the acoustically coupled signal by periodically isolating the coin station speech network from the office by apparatus which is automatically operative in the interval when the fraudulent signal may be applied to the coin station. According to another aspect of our invention, an error is introduced in the acoustically coupled signal during the time duration of the collection interval in which the coin deposit information is transmitted to the telephone office by advantageously isolating the coin station speech network from the telephone office.

BRIEF DESCRIPTION OF THE DRAWING

FIG. 3D is a schematic circuit diagram of an illustrative speech network in accordance with the invention; and FIG. 3E is a block diagram showing the arrangements of FIGS. 3A, 3B, 3C and 3D.

DETAILED DESCRIPTION OF THE INVENTION

Figure 1:
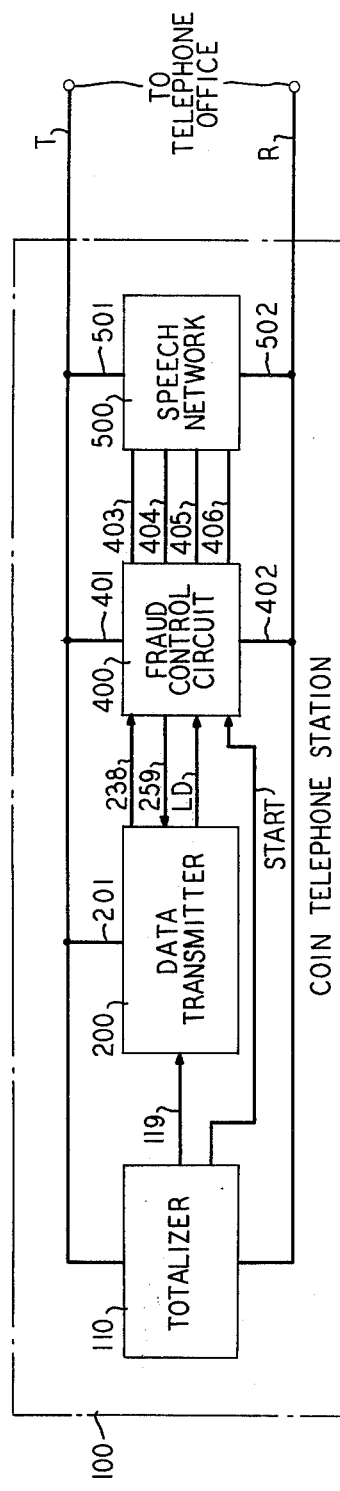
FIG. 1 is a schematic circuit diagram, in block form, showing the general functional relationship between the elements of a coin telephone station in accordance with the invention.

Broadly, in an illustrative embodiment of the invention shown in FIG. 1, coin telephone station 100 is connected by tip lead T and ring lead R to a local telephone office, not shown, and thence typically to a second telephone office, called a traffic service position system (TSPS), not shown, during the coin collection intervals. See, for example, the aforementioned U.S. Pat. No. 3,453,389. While so connected, the local telephone office reverses the polarity of a local telephone office battery serving the coin station. Upon coin station detection of the battery reversal, fraud control circuit 400 operates in accordance with our invention to advantageously place an attenuate control signal on leads 403, 404, and 405. Responsive thereto, speech network 500 is periodically attenuated. Thereby, errors are automatically introduced in any information signals acoustically coupled via speech network 500, e.g., a fraudulent coin deposit signal, without significantly impairing normal speech signals through speech network 500.

When coin deposit information is readied for transmission to the TSPS, totalizer 110 provides a start transmission control signal on lead START. Responsive thereto, fraud control circuit 400 places an inhibit control signal on lead 406 to inhibit speech network 500 from transmitting any signals over leads T and R to the TSPS. While speech network 500 is inhibited data transmitter 200 transmits the coin deposit information, extended from totalizer 110 via lead 119, to the TSPS over lead 201 and tip lead T. Subsequently, the local telephone office restores the battery to normal polarity until the coin telephone station requires further service. Coin telephone station 100 thus substantially obviates acoustically coupled coin deposit signals fraudulently inserted at the coin station in a simple and inexpensive manner without using an interrogation signal arrangement.

Totalizer 110, connected between leads T and R, is a conventional arrangement which registers and stores coin deposit information and, illustratively, may be an electronic totalizer of the type disclosed in U.S. Pat. No. 3,814,907, issued to J. E. Edington et al on June 4, 1974.

Figure 2:
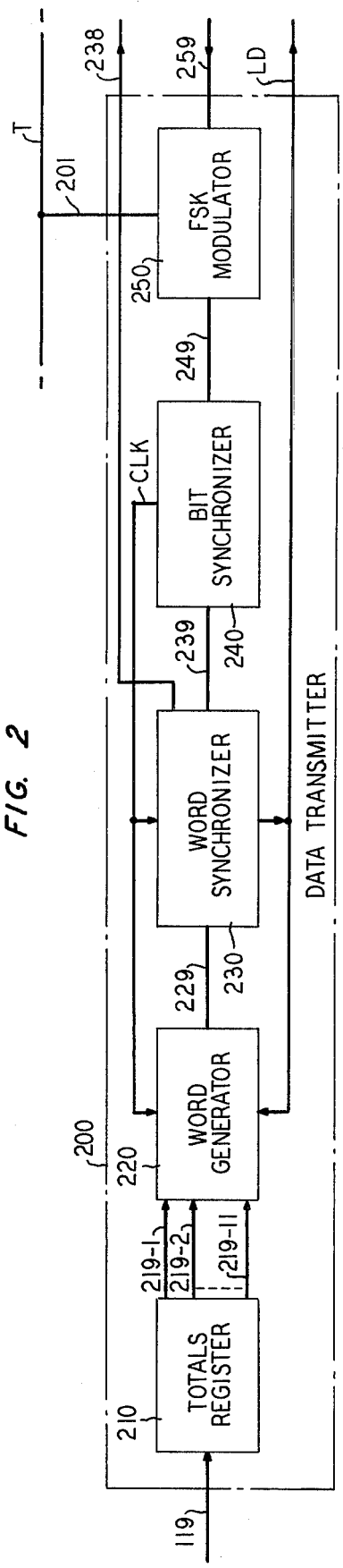
FIG. 2 is a schematic circuit diagram, in block form, of an illustrative data transmitter in accordance with the invention.
Figure 3A:
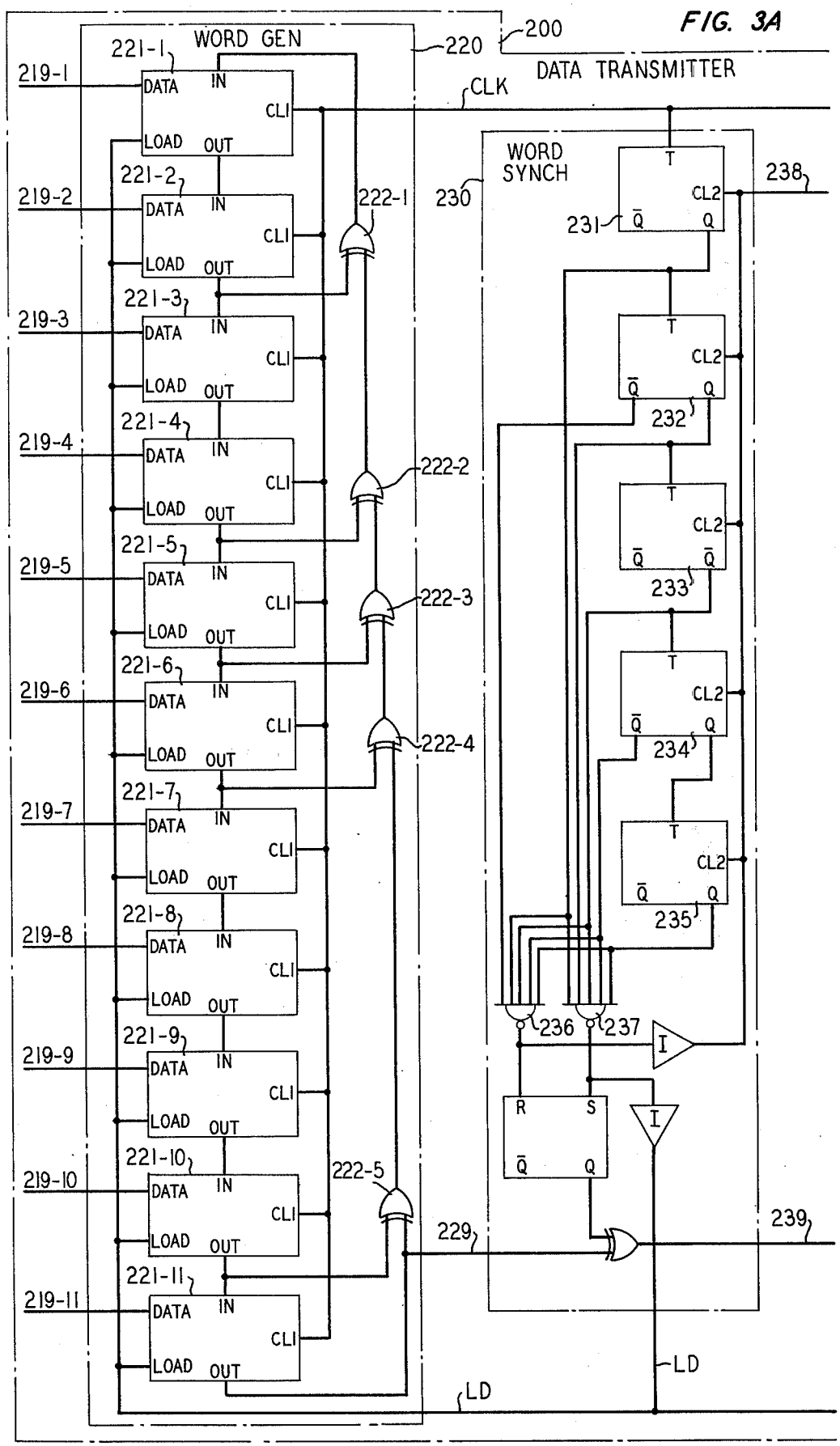
FIG. 3A is a schematic circuit diagram of an illustrative word generator and an illustrative word synchronizer which may be employed in the data transmitter of FIG. 2.
Figure 3B:
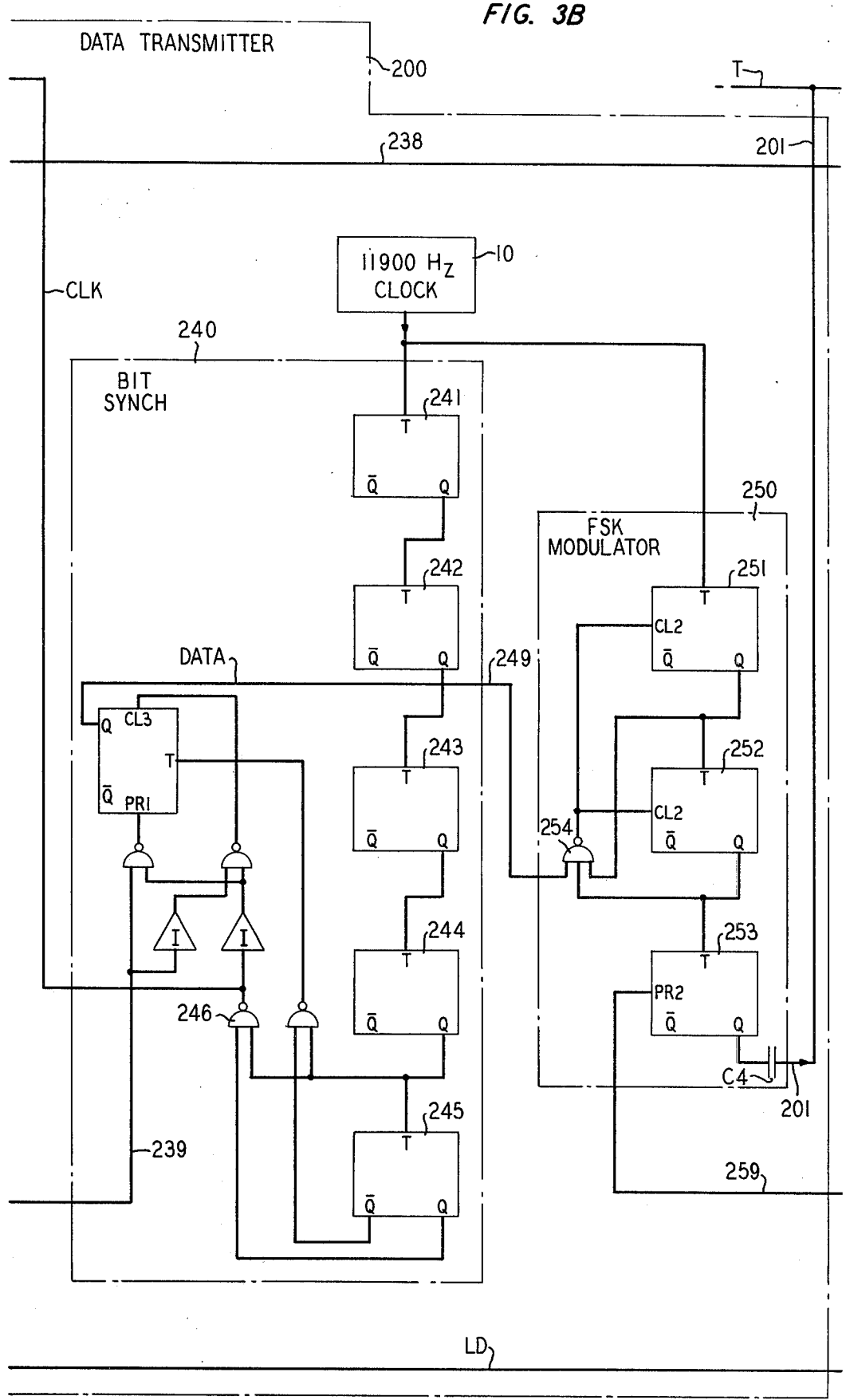
FIG. 3B is a schematic circuit diagram of an illustrative bit synchronizer and an illustrative FSK modulator which may be employed in the data transmitter of FIG. 2.

Data transmitter 200, an illustrative embodiment of which is shown in greater detail in FIGS. 2, 3A, and 3B, comprises a combination of conventional elements to sum, encode, and transmit the coin deposit information. In data transmitter 200, coin deposit information is encoded as a binary data word including coin deposit informataion bits, error detection bits, word framing bits, and synchronizing bits.

In the illustrative embodiment of data transmitter 200 shown in FIG. 2, coin deposit information, received from totalizer 110 over lead 119, is summed by totals register 210. Totals register 210 is typically a combination adder and serial-to-parallel converter of the type realizable by shift register logic for storing N bits of information, illustratively 11 bits in the following description.

The N parallel information bits are transferred from totals register 210 to word generator 220 over leads 219-1 through 219-11. Word generator 220 is a combination error detection code generator and parallel-to-serial converter. In order to obtain an acceptable level of reliability, M error control check bits, which are a linear combination of the N information bits, are appended to the N information bits. This permits telephone office decoder apparatus to detect errors in the encoded data word. For example, a (23,11) cyclic code, which advantageously appends 12 error control check bits to the 11 information bits to form a data word of 23 bits, is a distance eight code, which can detect up to seven errors randomly situated in the data word. Word generator 220, illustratively shown in FIG. 3A as comprising conventional shift registers 221-1 through 221-11 and feedback gates 222-1 through 222-5, is a (23,11) cyclic code word generator. See, for example, W. W. Peterson et al, *Error-Correcting Codes: Second Edition* (Cambridge, Mass.: MIT Press, 1972), Chapter 8.

Responsive to clock pulses on lead CLK, illustratively occurring at a clock rate of about 372 hertz, the N+M bits are serially transferred from word generator 220 to word synchronizer 230 over lead 229. Word synchronization, also called word framing in the art, is achieved by adding (addition modulo two) a preselected binary polynomial to the N+M bit data word. The preselected polynomial of $P(x) = 1 + x$ advantageously provides an acceptable balance between error detection capability and word synchronization capability for a (23,11) cyclic code with a distance eight. Accordingly, word synchronizer 230, illustratively shown in FIG. 3A as including a binary cell counter comprising conventional binary cells 231 through 235 and gates 236 and 237, adds the preselected polynomial to the data word. See, for example, U.S. Pat. No. 3,466,601—issued to S. Y. Tong on Sept. 9, 1969.

The word-synchronized N+M serial bit data word is thereafter transferred from word synchronizer 230 to bit synchronizer 240 over lead 239. Bit synchronization is achieved by transitional encoding apparatus, an illustrative embodiment being shown in FIG. 3B. Transitional encoding is a known encoding method employing the transition between two bits to transmit one binary digit. For example, a binary one is encoded as a binary one followed by a binary zero and a binary zero is encoded as a binary zero followed by a binary one. Transitional encoding doubles the transmission bit rate, illustratively here to about 744 hertz. Beneficially, since each information bit is associated with a data transition, bit synchronization is recoverable by telephone office apparatus directly from the encoded data word signal. Bit synchronizer 240, illustratively shown as including a count-down circuit comprising flip-flops 241 through 245 and gate 246, also provides the aforementioned 372 hertz clock pulse rate appearing on lead CLK, lead CLK being connected to an output of gate 246.

The encoded data word is transferred from bit synchronizer 240 to a conventional frequency shift key (FSK) modulator 250 over lead 249. Modulator 250, illustratively shown in FIG. 3B as comprising a shift register count-down chain, includes shift registers 251, 252, and 253. Clock 10, jointly connected to an input of flip-flop 241 and to an input of shift register 251, illustratively operates at a rate of about 11,900 hertz. Responsive to pulses from clock 10, the count-down chain divides the frequency of clock 10 by six whenever a binary one is detected by gate 254 on lead 249 for transmission to the telephone office over lead 201. Similarly, the count-down chain divides the frequency of clock 10 by eight whenever a binary zero is detected on lead 249 by gate 254 for transmission to the telephone office over lead 201. Accordingly, a binary one is transmitted at about 1,488 hertz and a binary zero at about 1983 hertz.

Figure 3C:
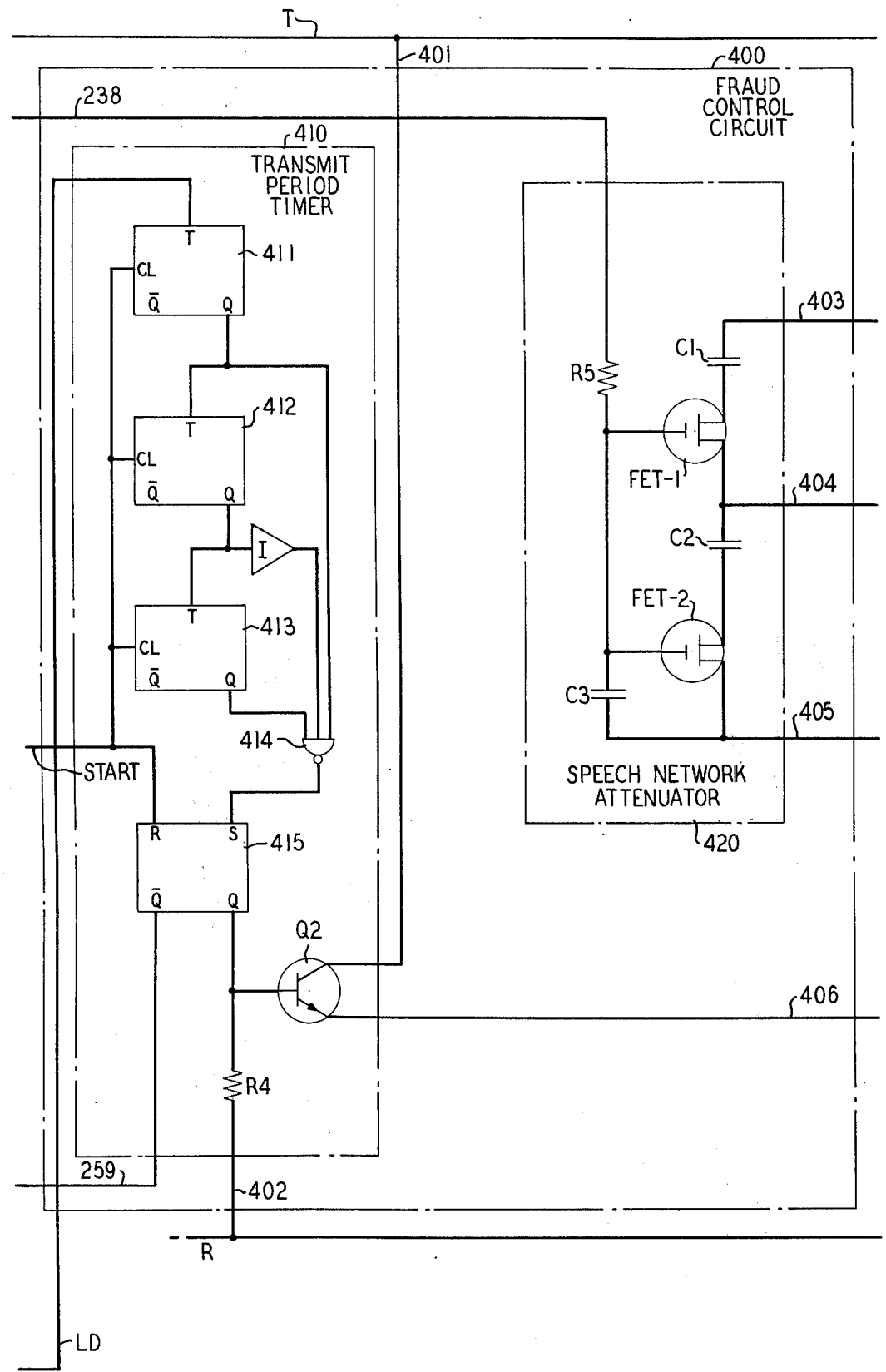
FIG. 3C is a schematic circuit diagram of an illustrative embodiment of a coin telephone station fraud control circuit in accordance with the invention.

To further increase reliability and to advantageously enable startup in the absence of an interrogation signal arrangement, the coin deposit information transferred from the coin station to the telephone office is treated as a data block comprising a plurality of identical data words. In particular, in the illustrative embodiment herein, a data word, being repetitively transmitted five times, permits an acceptable probability of an error free transfer of a data word. Accordingly, as shown in FIG. 3C, fraud control circuit 400 includes transmit period timer 410, which is enabled upon detection of the start transmission control signal on lead START. Timer 410 includes conventional counter apparatus, comprising binary cells 411 through 413. The timer is advantageously incremented, responsive to a signal on lead LD from word synchronizer 230, the signal indicating that a data word may be loaded into word generator 220. Responsive to the detection of a count of five, gate 414 provides a binary signal to an input of flip-flop 415. An output signal from flip-flop 415 is provided to lead 259. Responsive thereto, FSK modulator 250 is disabled. A second output of flip-flop 415 advantageously controls transistor Q2 to provide a signal on lead 406, which signal is the inhibit control signal employed by speech netword inhibitor 510 in FIG. 3D, as described in detail hereinafter.

Fraud control circuit 400 further includes speech network attenuator 420, as shown illustratively in FIG. 3C, to periodically attenuate any acoustically coupled signals. Responsive to a periodic output signal from gate 236 of word synchronizer 230 in FIG. 3A, the periodic attenuate control signal is supplied on lead 238, thence through resistor R5 jointly to a control electrode of each transistor FET1 and FET2 and to one terminal of capacitor C3 of speech network attenuator 420. The other terminal of capacitor C3 is connected to lead 405. Speech network attenuator 420 also includes capacitor C1, one terminal of which is connected over lead 403 to speech network 500, and the other terminal of which is connected through transistor FET1 over lead 404 to speech network 500. One terminal of capacitor C2 is also connected to lead 404 and the other terminal thereof is connected through transistor FET2 over lead 405 to speech network 500. Within speech network 500, as shown in FIG. 3D, receiver REC is connected between leads 403 and 404, and speech transmitter TRAN is connected between leads 404 and 405. Accordingly, speech network attenuator 420 periodically provides a transmission loss to signals applied to speech transmitter TRAN of speech network 500, thereby periodically attenuating any acoustically coupled signals. The periodic isolating of speech network 500 from the telephone office in this manner automatically introduces an error in any acoustically coupled coin deposit signals which may be fraudulently inserted in speech network 500. However, normal speech signals through speech network 500 will not be impaired significantly.

Speech network 500, connected to tip lead T by lead 501 and to ring lead R by lead 502, may be substantially similar to the arrangement disclosed in U.S. Pat. No. 3,546,395 issued to P. O. Schuh on Dec. 8, 1970. Speech network 500 illustratively comprises speech network inhibitor 510, including transistor Q1 connected between leads 405 and lead 502. Responsive to the inhibit control signal on lead 406 connected to a control electrode of transistor Q1, speech network inhibitor 510 disconnects and substantially isolates speech transmitter TRAN from the telephone office, thereby inserting a substantial transmission loss in any fraudulent signal inserted at transmitter TRAN. The inhibit control signal is provided on lead 406 by control circuit 400 when FSK modulator 250 is enabled to transmit coin deposit information to the telephone office.

Although the invention has been described and illustrated in detail, it is to be understood that the same is by way of illustration and example only and is not to be taken by way of limitation, the spirit and scope of the invention being limited only by the terms of the appended claims.

We claim:

1. In a coin telephone station having voice signal input means, coin deposit input and detection means, and means for translating a coin deposit into encoded information for transmission to a telephone office, the improvement comprising means for obviating acoustical coupling of a fraudulent coin deposit information signal applied through said voice signal input means, said obviating means including means automatically operative during a coin collection interval when said fraudulent signal may be applied through said input means for introducing an error in said fraudulent coin deposit information signal.

2. A coin telephone station according to claim 1 further having means for connecting said station to a telephone line wherein said error introducing means comprises means for periodically isolating said fraudulent signal from said telephone line.

3. A coin telephone station according to claim 1 wherein said error introducing means comprises means for periodically attenuating signals applied to said voice signal input means.

4. A coin telephone station according to claim 3 wherein said attenuating means includes a switch operative for shunting said voice signal input means and means for periodically operating said switch.

5. A coin telephone station according to claim 4 wherein said switch comprises a field effect transistor connected in parallel with said voice signal input means.

6. A coin telephone station according to claim 1 wherein said obviating means further includes means for inhibiting operation of said voice signal input means during transmission of coin deposit information to said telephone office.

7. In a coin telephone station of the type wherein said coin station is connectable to a telephone office, and wherein said coin station includes a speech network for transmitting to said telephone office a voice frequency signal applied to said coin station, coin deposit information detection means, and means for transmitting detected coin deposit information to said telephone office, the improvement comprising:

means automatically operative during a coin collection interval when said telephone station is connected to said telephone office for obviating a coin deposit signal fraudulently applied to said speech network, said obviating means including:

means for periodically attenuating said fraudulent coin deposit signal so that an error is inserted in said fraudulent signal, and means for inhibiting said fraudulent signal during transmission of said coin deposit information from said coin station to said telephone office.

8. A coin telephone station according to claim 7 wherein said coin station speech network includes a speech transmitter having at least two terminals and wherein said attenuating means comprises:

means responsive to a periodic attenuating signal for providing a periodic transmission loss, said loss means having a control terminal and at least two other terminals, means for connecting said transmission loss means through said two other terminals in parallel with said speech transmitter, and means for adapting said control terminal of said loss means to receive said periodic attenuating signal.

9. A coin telephone station according to claim 8 wherein said transmission loss means comprises a transistor connected in parallel with said speech transmitter, said control terminal being connected to a control electrode of said transistor.

10. A coin telephone station according to claim 7 wherein said coin station includes at least one terminal, wherein said coin station speech network includes a speech transmitter having at least one terminal, and wherein said inhibiting means comprises:
  means responsive to an inhibiting signal for providing a transmission loss, said loss means having a control terminal and at least two other terminals,
  means for connecting said transmission loss means through said two other terminals of said loss means in series between said speech transmitter terminal and said coin station terminal, and
  means for adapting said control terminal of said loss means to receive said inhibiting signal.

11. A coin telephone station according to claim 10 wherein said transmission loss means comprises:
  switching means connected in series between said speech transmitter terminal and said coin station terminal, and
  means responsive to said inhibiting signal for operating said switching means.

* * * * *